ASSOCIATIVE MEMORY SYSTEM

Filed May 14, 1963 2 Sheets-Sheet 1

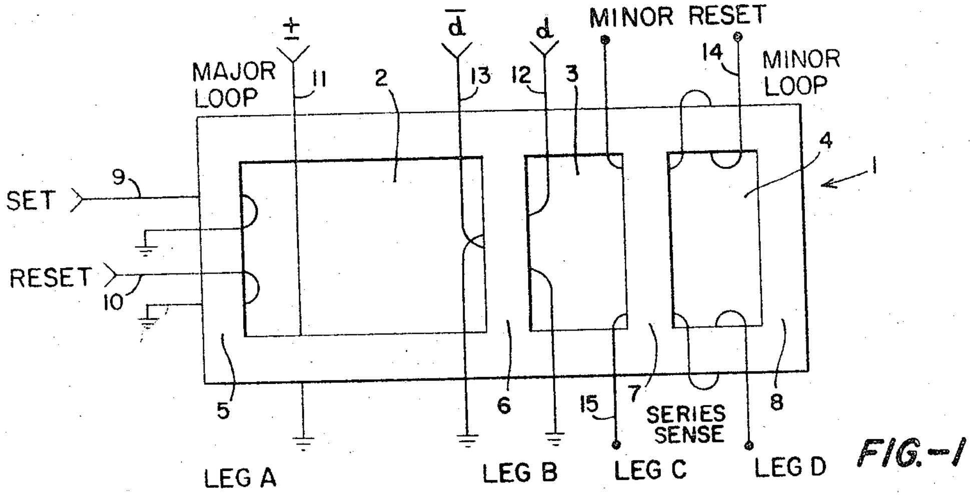

FIG.-1

| | | LEG A | LEG B | LEG C | LEG D |
|---|---|---|---|---|---|
| WITH 0 IN MAJOR LOOP | RESET MAJOR | ⇑ | ⇓ | ↑ | ↓ |
| | d | ↑ | ⇑ | ⇓ | ↓ |
| | RESET MINOR | ↑ | ⇓ | ⇑ | ↓ |
| | d̄ | ↑ | ↓ | ↑ | ↓ |
| | RESET M | ↑ | ↓ | ↑ | ↓ |
| WITH 1 IN MAJOR | SET MAJOR | ⇓ | ⇑ | ↑ | ↓ |
| | d | ↓ | ↑ | ↑ | ↓ |
| | RESET MINOR | ↓ | ↑ | ↑ | ↓ |
| | d̄ | ↓ | ⇓ | ↑ | ⇑ |
| | RESET MINOR | ↓ | ⇑ | ↑ | ⇓ |

FIG.-2

TRUTH TABLE – EXCLUSIVE "OR" FUNCTION

| MAJOR | MINOR | OUTPUT | |
|---|---|---|---|
| 0 | 0 | 0 | |
| 0 | 1 | 1 | OUTPUT ONLY IF MAJOR OR MINOR DIFFER IN VALUE |
| 1 | 0 | 1 | |
| 1 | 1 | 0 | |

FIG.-3

INVENTORS.
JOHN T. FRANKS JR.
GENE T. TUTTLE
BY A. H. Oldham
ATTORNEY

INVENTORS.
JOHN T. FRANKS JR.
GENE T. TUTTLE
BY [signature]
ATTORNEY 3,300,760
ASSOCIATIVE MEMORY SYSTEM
John T. Franks, Jr., and Gene T. Tuttle, Akron, Ohio, assignors to Goodyear Aerospace Corporation, a corporation of Delaware
Filed May 14, 1963, Ser. No. 280,391
4 Claims. (Cl. 340—172.5)

This invention relates to an associative memory system, and more particularly to a digital memory storage system adapted for associative memory functions wherein the memory features of the system are not destroyed during the associative memory operation.

Heretofore it has been known that present day digital computers, series or parallel, are basically word orientated machines. Arithmetic or logical operations, along with memory, are sequenced by function and the computer solves all problems on a word-by-word basis. When restricted to this mode of operation, computation in existing digital systems is still relatively fast. However, some standard logical operations such as table look-up or memory search routines create several problems to the existing digital systems because some definite but unknown memory location is desired. Usually, in order to achieve the desired location the computer is sequenced through all or some portion of memory until some desired logical operation is achieved. Therefore, with increasingly larger memory systems, memory searching time becomes prohibitively long. In the ever changing and complex world of today, it is extremely important that information stored in memory should be located accurately, and in the shortest possible time. With the conventional computer total time to locate a desired word stored in an unknown memory location depends upon the logical approach to the problem, memory speeds, and the size of the memory.

It is the general object of the invention to avoid and overcome the foregoing and other difficulties of and objections to prior art practices by a digital memory storage system wherein words may be written into memory in the conventional manner; wherein words may be read from a desired address in the memory system in a non-destruct manner; but, wherein a comparison word may be simultaneously compared with every word written into memory, wherein the compare function is accomplished in one memory cycle time, and wherein the addresses of all words written into memory that correspond with the compare word are provided by the system at the completion of the compare function.

Another object of the invention is to provide a digital memory storage system adapted for associative memory thereby making the compare time essentially constant, and making the compare function independent of the logical approach to the problem.

Another object of the invention is to provide a digital memory storage system adapted for associative memory wherein the information stored in memory is not disturbed or destroyed during the associative memory operation.

Another object of the invention is to provide a digital memory storage system adapted for associative memory wherein the word to be compared can be masked in any desired manner so that only the unmasked portion of the compare word will be compared during the associative memory operation.

The aforesaid objects of the invention, and other objects which will become apparent as the description proceeds, are achieved by providing in a digital memory storage system adapted for associative memory the combination of a memory unit, the memory unit comprising a plurality of multi-apertured ferrite magnetic cores, means to write words into memory in the cores of the memory unit, means to read any individual word written into memory by knowing the address thereof in the memory unit, means to load a compare word into the memory storage system, means to simultaneously compare the compare word with every word stored in the memory unit, means to mask any portion of the compare word so that only the unmasked portion will be compared, and means to indicate the address of all words written into the memory unit which correspond to the compare word.

For a better understanding of the invention reference should be had to the accompanying drawings, wherein, FIGURE 1 is a schematic diagram of a multi-apertured ferrite core employing the embodiments of the invention;

FIGURE 2 is a flux state diagram for the core of FIGURE 1, and showing the change in flux patterns occurring in the core during operation;

FIGURE 3 is truth table of the circuit of FIGURE 1; and

Figure 4:
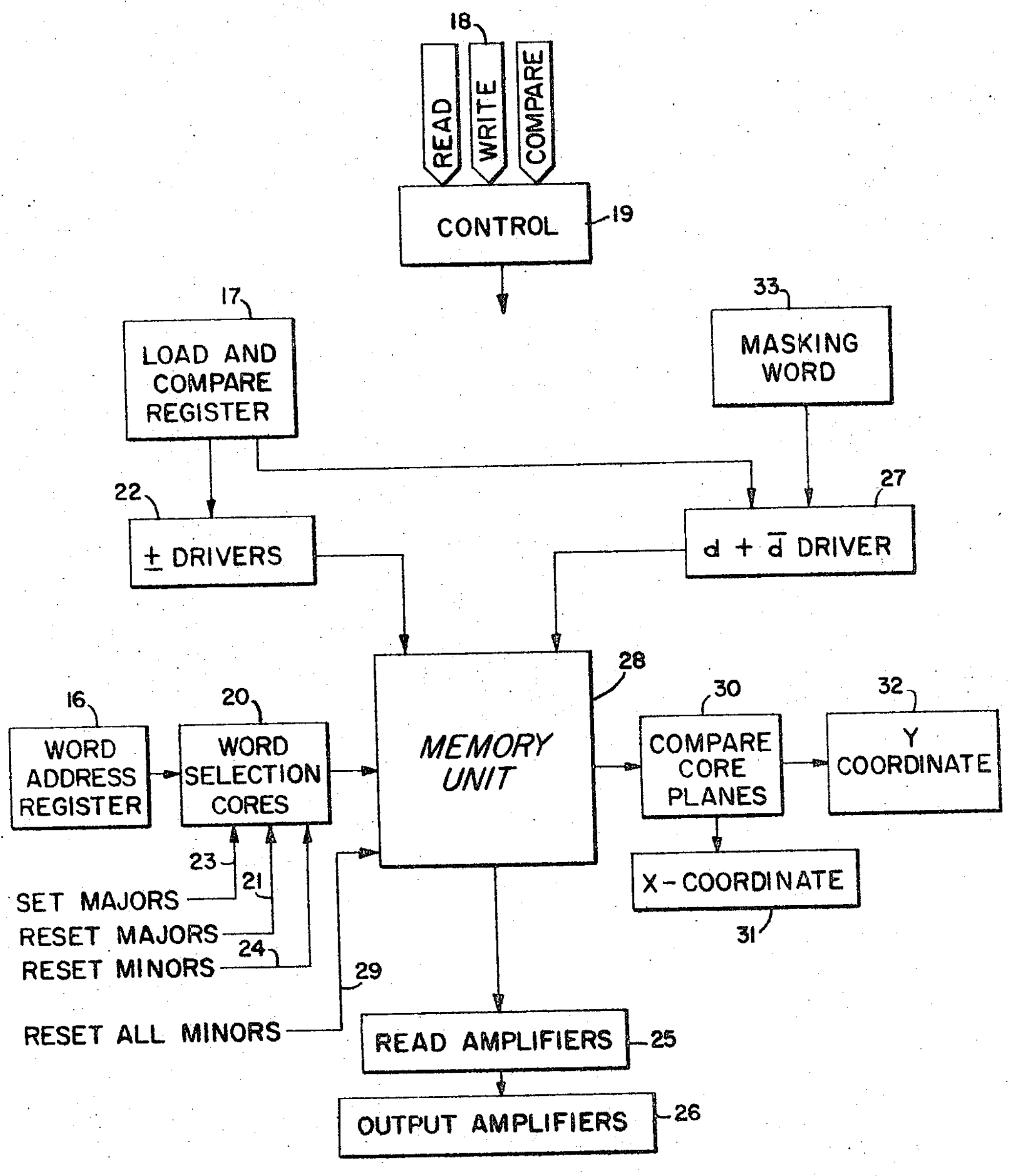
FIGURE 4 is an associative memory block diagram showing how the various units function in relation to each other.

With specific reference to the form of the invention illustrated in the drawings, and with particular reference to FIGURE 1, the numeral 1 indicates generally a multi-apertured ferrite device consisting of a major aperture 2 and two minor apertures 3 and 4. The core 1 is physically constructed so that a flux pattern induced into the major loop around the major aperture 2 will not be affected by a flux pattern induced into the minor loop whether the minor loop flux pattern encircles the aperture 3 or the aperture 3 and 4 together. The physical construction and properties of this core are more particularly described in a patent application assigned to Goodyear Aircraft Corporation entitled "Multi-Aperture Logic Element" filed November 30, 1961, Serial No. 155,900.

The core 1 of FIGURE 1 has four legs indicated by numerals 5, 6, 7, and 8 and labelled as legs A through D respectively. Legs A and B enclose the major aperture 2 and describe the major loop. Legs B, C, and D enclose the minor apertures 3 and 4 and describe the minor loop. In order to provide the major loop with a flux pattern a set circuit, indicated by line 9, is provided. When reprogramming a computer it is necessary to reset all the major loops, and therefore a reset line, indicated as line 10, is provided. A plus-minus line, indicated at 11, is provided to assist in setting the major loop, as will be more fully explained hereinafter.

A pair of digital lines, labelled $d$ and $\bar{d}$, and indicated at 12 and 13 respectively are wound around leg B of the minor loop to set a flux pattern into the minor loop, and also to compare the flux pattern in the major loop, as will be more fully explained hereinafter. A minor reset line, indicated by line 14 is provided to reset the flux pattern in the minor loop, in the same manner as the reset line 10 is utilized for the major loop. A series sense line indicated by line 15 is provided in the minor loop to sense a signal readout for utilization in the associative function, all as more fully described hereinafter.

In order to more fully understand the operation of the magnetic core 1 a flux state diagram is shown in FIGURE 2. The double arrows indicate which legs change state. The operation of the core as shown in the diagram is as follows:

(1) A ONE or ZERO (which indicates a flux pattern in one direction or the other) is set into the major loop by causing a constant current to flow into either the set or reset lines 9 and 10 respectively. The resulting M.M.F. is just enough to fully switch around legs A and B, in FIGURE 1, and not effect legs C or D.

(2) A ONE or a ZERO may then be compared in the major loops by causing a constant current to flow into either the $d$ or $\overline{d}$ lines. In either case, only legs B or C or B and D may change. No switching can occur in leg A as explained before and covered in the pending patent application for the core structure.

(3) Then by causing a constant current to flow into the minor reset line 14, and at this time, monitoring the series sense line 15, a pulse will be observed if the digital information set into either of the digit lines $d$ or $\overline{d}$ differs from that set into the major loop.

As indicated in FIGURE 3 of the truth table, if the information stored in the major loop is the same as that stored in the minor loop, then there will be no output on the series set line 15 during the resetting of the minor loop by the minor reset line 14. However, if there is a difference between the flux pattern set in the major loop and the minor loop then a pulse will be observed on the series sense line 15 when the minor loop is reset by the minor reset line 14. This is the exclusive "OR" function.

The exclusive "OR" function can be seen in the flux pattern diagram of FIGURE 2. In the group labelled with ZERO set in the major loop, the reset major line, which resets ZERO into the loop indicates an up change flux pattern in leg A, and a down changed flux pattern in leg B. If current flow is effected in the $d$ line, which represents a positive or ONE digit, it can be seen that the flux pattern in leg A is upward without a change, the flux pattern in leg B shifts upwardly with a change, the flux pattern in leg C shifts downwardly with a change, and the flux pattern in leg D remains downwardly without a change. Therefore, when the reset minor line 14 is energized the flux pattern in leg A remains upward unchanged, the flux pattern in leg B changes to downward, the flux pattern in leg C changes to upward, and the flux pattern in leg D remains downward. This changes the state of the core to the original state where the major loop is described by legs A and B and the minor loop described by legs C and D.

The flux change caused when the minor reset is energized is picked up on the series sense line 15 thereby indicating a dissimilarity between the flux value in the major loop, and the flux value caused by the current through the $d$ line in the minor loop. It should be noted that the flux change signal could be picked up by the series sense line 15 when the $d$ line in 12 is energized, and in practice it has proved to be more efficient and less noisey in operation to pick up the change signal on the series sense line 15 when either the $d$ or $\overline{d}$ lines are energized.

Referring again to FIGURE 2, with ZERO in the major loop, when the $d$ line representing a ZERO value is introduced into the minor loop, no flux changes occur. Therefore, no flux changes occur when the reset minor line is energized following the $\overline{d}$ energization. These two situations with a ZERO in the major loop as described above correspond to the first two situations illustrated in the truth table of FIGURE 3.

Let us now consider the flux pattern in the core 1 when a positive flux or a ONE value has been introduced into the major loop. Referring to FIGURE 2, it is seen that when the major loop is set a downward changed flux is indicated in leg A, an upward changed flux is indicated in leg B, an upward unchanged flux is indicated in leg C, and a downward unchanged flux is indicated in leg D. Thus, legs A and B describe the major loop with legs B, C and D describing the minor loop. When the $d$ line 12 is energized, the downward flux in leg A remains unchanged, the upward flux in leg B remains unchanged, the upward flux in leg C remains unchanged, and the downward flux in leg D remains unchanged. Thus, when the reset minor line 14 is energized, no changes take place in any of the flux patterns. However, when the $\overline{d}$ line 13, representing a ZERO value, is energized the downward flux in leg A remains unchanged, but the flux in leg B is shifted to downward, the flux in leg C remains unchanged as upward, but the flux in leg D is shifted to upward. Therefore, when the reset minor line 14 is energized the flux in leg A remains unchanged downward, the flux in leg B is shifted to upward, the flux in leg C remains unchanged upward, and the flux in leg D is shifted to downward. This changes the state of the core to the original state where the major loop is described by legs A and B, and the minor loop described by legs B, C and D. Again, the series sense line 15 monitors the change in flux effected by the minor reset pulse on either the $d$ or $\overline{d}$ pulses to detect the difference in the values between the major loop and the minor loop.

An associative memory word consists of a number of cores wired together. Each core provides one bit of storage. Word length may be up to several hundred bits long. An associative memory utilizes the exclusive "OR" function described above which is $A \cdot \overline{B} + \overline{A} \cdot B$. However, the identity function of $A \cdot B + \overline{A} \cdot \overline{B}$ which is available from the core 1 as described in the patent application cited above, could also be used in the associative function.

The complete memory system is shown by block diagram in FIGURE 4. Read-write operations are performed on a linear selection basis, as described in chapter 24, page 391, of "Digital Applications of Magnetic Devices" by Albert J. Meyerhoff, with typical operation as follows:

*Writing*

Writing into memory consists of setting a ONE or a ZERO into the major loop of each core. This is the only operation that effects the major loop and with reference to FIG. 4, is accomplished as follows:

I. Setting the desired word location into the Word Address Register 16.

II. Setting the word to be loaded into the Load and Compare Register 17.

III. Activating the Write portion 18 of the Control Mechanism 19 which starts the following sequence of events:

(A) The contents of the Word Address Register 16 are decoded by the Word Selection Cores 20 to select one specific word in memory.

(B) The reset major line 21 then resets all major loops in the selected word to ZERO by directing a current through the reset line of each core, as described before.

(C) Immediately following the reset major pulse the ± drivers 22 are gated on. These drivers are controlled by the contents of the Load and Compare Register 17 and perform the function of assisting in either setting or not setting the major loop in each core. The ± drivers are bit oriented and thread through the entire memory. The resultant M.M.F. from the ± lines is less than the threshold M.M.F. of each major loop so no core switching occurs at this time. Usually, the ± driver value is set at about ⅓ the threshold level necessary to switch the flux pattern in the major loops.

(D) The Set Major line 23 is then turned on. The value of the current on the Set Major 23 is positive and usually about ⅔ of the threshold value necessary to effect a flux shift in the major loops. This word oriented current, which is a constant value, then combines with the ± driver's pulses with the following results:

(1) For every ONE located in the Load and Compare Register 17 the respective ± driver transmits a positive ⅓ current and for every ZERO a negative ⅓ current.

(2) Each + driver line then aids the major set line and the resultant M.M.F. (⅓ from the + driver and ⅔ from the set major) fully switches the major loop to a ONE.

(3) Each − driver line subtracts from the major set line. Here the resultant M.M.F. (−⅓ driver plus +⅔ set major equals +⅓) is less than the threshold of the major loop and no switching occurs, thereby leaving the core in the ZERO state caused by the reset operation.

(E) The operation is now complete. The actual time required to write into memory depends upon the switching speed of the ferrite material chosen for the core and may range from a fraction of a micro-second to several micro-seconds.

*Reading*

The Read operation is performed by interrogating the minor loops in the core. Since the major loop is not effected during the read cycle the memory is non-destructive in operation. To read memory the $\bar{d}$ lines from the $d$ and $\bar{d}$ driver 27 are turned on. The $\bar{d}$ lines are bit orientated and thread through all of memory. Referring to the flux pattern of FIGURE 2, it will be seen that each respective minor loop will switch only if the major loop contained a ONE, when the minor loop is pulsed by a $\bar{d}$ current. Since parallel sensing is required the series sense line 15 is not used during the read operation. Parallel sensing can be accomplished by monitoring either the $d$ or $\bar{d}$ line when resetting the minor loop. After the $\bar{d}$ line has been pulsed, the desired word is again selected by the Word Selection Cores 20 and the reset minor line 24 for only the selected word is turned on and fed into the word selection core 20. At this time the read amplifiers 25 are gated on and the desired word is now contained in the Output Register 26. Notice that all of the minor loops in memory may have changed state by turning on the $\bar{d}$ line, but this is of no consequence since readout was sensed on a word basis by turning on only the one reset minor line 24 for the word to be read. The readout operation requires ½ the time required for the write operation since the major loops do not have to be reset and set. Also, if succeeding read operations on additional words are required, the $\bar{d}$ line from the $d$ and $\bar{d}$ Driver 27 need not be turned on again thus obtaining an even faster read function.

*Compare operation*

The associative function of comparing a word stored in the Load and Compare Register 17 to all of the Memory Unit 28 is accomplished as follows:

(A) First the minor loops of every word in memory are reset to ZERO by applying a current pulse to the reset ALL minor line 29, shown in FIGURE 4. While the minor loops are being reset, the compare word is transferred into the Load and Compare Register 17. The contents of the Compare Register 17 determines, bit by bit, which $d$ driver ($d+\bar{d}$) 27 is gated on. For every ZERO in the compare register, the $\bar{d}$ line driver is gated on and for every ONE the $d$ line driver is gated on. Thus, for each bit location, either a $d$ or $\bar{d}$ driver is turned on. It should be noted that both the operations of resetting the minor loops and then gating on the $d$ drivers are memory oriented functions where the entire memory unit 28 is operated upon.

We have shown earlier that if the digital information set into the minor loops via the digit lines $d$ and $\bar{d}$, indicated at 12 and 13 in FIGURE 1, differs from that stored in the major loop, an output pulse will be observed on the series sense line 15, upon resetting the minor loops. The reverse of this is also true, as explained previously, that is, if first the minor loops are reset to ZERO and the series sense line 15 is monitored upon applying current to the $d$ and $\bar{d}$ lines, 12 and 13, a pulse will be observed if the digit information differs from that stored in the major loop. The only difference between the two methods of determining whether a signal is present is that a better signal to noise ratio is obtained by sensing during either the $d$ or $\bar{d}$ pulses, which therefore makes that method preferable.

(B) The series sense lines 15 of all cores making up one memory word are wired together thus providing the means of detecting if any minor loop changed state during the compare operation. Note that the series sense line indicates the complement of the desired function, where a pulse indicates non-compare and the absence of a pulse indicates the desired compare operation.

(C) Resolving which words in the cores memory were successfully compared to the compare word is accomplished by feeding the series sense lines 15 from the Memory Unit 28 through two parallel standard toroidal core planes in the Compare Core Planes Section 30. The cores of the Compare Core Planes Section 30 are so arranged and related to the series sense lines so as to divide the word locations in memory into columns of bit orientated cores and rows indicating the specific words in memory. The cores in the Planes Section 30 are set by the current pulses from the series sense lines 15. The cores in the Planes Section 30 are interrogated by reading all the columns simultaneously first, and then sequentially reading the rows in each column that indicates a signal. The signals from each row are then broken down into X and Y coordinates and sent to the X-coordinate section 31 and the Y coordinate section 32 to describe the address of any and all words in the memory unit 28 corresponding to the compare word. The structure and interrogation of the planes in the Planes Section 30 are the subject of a patent application entitled "Resolving Multiple Responses in an Associative Memory" which will be filed subsequently. It is to be understood that standard solid state devices could be used in place of the Planes Section 30 to locate the address of all words in the Memory Unit 28 corresponding to the compare word. However, the desirable feature of the planes in the Planes Section 30 is that the number of solid state devices necessary for operation is reduced to 2 times the square root of the number of devices necessary in the conventional system.

A masking function provides the capability of selecting any part of the memory words on which to compare. A mask control word is stored in the Masking Register 33. The function of this control word is to indicate the bits to be masked out of the compare operation. A bit is masked out of the compare function simply by inhibiting both the $d$ and $\bar{d}$ drivers of the bit in the $d$ and $\bar{d}$ Driver 27 so that this bit does not enter into the compare operation.

The block portions of the diagram of FIGURE 4 not explained in detail are conventional equipment equipment used on all digital memory storage systems in use today. Also, a plurality of conventional flip flops could be utilized in place of the Compare Core Planes 30 to indicate the address of a word or words corresponding to the compare word.

Therefore, it is seen that the objects of the invention in utilizing a digital memory storage system for associative memory are accomplished by providing $d$ and $\bar{d}$ lines which are bit oriented through the entire memory, and which can be pulsed to compare the entire memory with the compare word in one cycle. Obviously, the pulses through the $d$ and $\bar{d}$ lines must be of sufficient strength to carry through the entire memory. However, due to the construction of the cores no flux change takes place in the major loops therefore making the associative memory function non-destructive. Thus, a very simple, yet highly effective, associative memory function has been added to the normal read and write functions of the conventional digital computer.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. A digital storage system adapted for associative memory comprising a plurality of multi-apertured ferrite magnetic cores, said cores each having a major loop and two minor loops, means to set and reset flux patterns into the major loops, means to set and reset flux patterns into the minor loops, means to detect a change to the flux pattern of the minor loops during the set or reset thereof, means to apply a compare word to the system, means to store words in memory as bits of information with each bit stored in a single core, means to simultaneously compare all words stored in the system with the compare word in one current pulse time, and means to indicate the address of all stored words which correspond with the compare word.

2. In a digital memory storage system adapted for associative memory utilizing the exclusive OR function the combination of a memory unit comprising a plurality of multi-apertured magnetic cores, said cores comprising a major loop and two minor loops, means to store a bit of information into each core by setting flux pattern into the major loop, means to set a flux pattern into the minor loops, said loop construction being such that a change to the flux pattern of the minor loops does not affect the flux pattern of the major loop, means to apply a compare word comprising a plurality of bits of information stored into the system, means to simultaneously compare the total bits comprising the compare word with the total bits comprising every word stored in the cores of the memory unit in one current pulses bit time, means to determine the word address of all words in the memory unit which correspond exactly with the compare word.

3. In a digital memory storage system the combination of a memory unit,

- a plurality of magnetic cores comprising the memory unit with each core having a major loop and two minor loops with each loop adaptable to carry a flux pattern, the cores being systematically oriented in groups so that each group of cores describe a word with each individual core of each group comprising a bit of the word,
- means to individually set a desired flux pattern into the major loop of each core,
- means to orient the bits of a compare word comprised of a group of bits with the bits of all the words comprised of the groups of cores of the memory unit,

- means to simultaneously in one current pulse bit time set bit information of the compare word as a flux pattern into the minor loops of every core of the memory unit,
- means to sense if the flux pattern in the major and minor loops of each core are similar in a non-destructive readout,
- means to determine if a group of cores comprising a word of the memory unit are similar to the group of bits comprising the compare word, and
- means to identify the address of any word in the memory unit which correspond to the compare word.

4. In a digital memory storage system the combination of a memory unit,

- a plurality of magnetic cores comprising the memory unit with each core having a major loop and two minor loops with each loop adaptable to carry a flux pattern, the cores being systematically oriented in groups so that each group of cores describe a word with each individual core of each group comprising a bit of the word,
- means to individually set a desired flux pattern into the major loop of each core,
- means to orient the bits of a compare word comprised of a group of bits with the bits of all the words comprised of the groups of cores of the memory unit,
- means to simultaneously in one current pulse bit time set bit information of the compare word as a flux pattern into the minor loops of every core of the memory unit, and
- means to sense if the flux pattern in the major and minor loops of each core are similar in a non-destructive readout.

References Cited by the Examiner

UNITED STATES PATENTS

| | | | |
|---|---|---|---|
| 3,031,650 | 4/1962 | Koerner | 340—174 |
| 3,196,280 | 7/1965 | Franks | 307—88 |

ROBERT C. BAILEY, *Primary Examiner.*

R. B. ZACHE, *Assistant Examiner.*